US012674763B2

(12) United States Patent
Nagashima et al.

(10) Patent No.: US 12,674,763 B2
(45) Date of Patent: Jul. 7, 2026

(54) OPTICAL-TYPE FOREIGN MATTER INSPECTION DEVICE

(71) Applicant: HITACHI HIGH-TECH CORPORATION, Tokyo (JP)

(72) Inventors: Tomoharu Nagashima, Tokyo (JP); Hisaaki Kanai, Tokyo (JP); Masami Makuuchi, Tokyo (JP); Masaya Yamamoto, Tokyo (JP); Shunichi Matsumoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 80 days.

(21) Appl. No.: 18/702,632

(22) PCT Filed: Dec. 23, 2021

(86) PCT No.: PCT/JP2021/048007
§ 371 (c)(1),
(2) Date: Apr. 18, 2024

(87) PCT Pub. No.: WO2023/119589
PCT Pub. Date: Jun. 29, 2023

(65) Prior Publication Data
US 2025/0224342 A1 Jul. 10, 2025

(51) Int. Cl.
*G01N 21/94* (2006.01)
*G01N 21/47* (2006.01)
*G01N 21/95* (2006.01)

(52) U.S. Cl.
CPC ......... *G01N 21/94* (2013.01); *G01N 21/4738* (2013.01); *G01N 21/9501* (2013.01);
(Continued)

(58) Field of Classification Search
CPC ....... G01N 2021/8848; G01N 21/4738; G01N 21/94; G01N 21/9501; G01N 21/956;
(Continued)

(56) References Cited

U.S. PATENT DOCUMENTS 5,416,512 A * 5/1995 Kim ..................... G01R 31/311
348/130
6,411,377 B1 6/2002 Noguchi et al.
(Continued)

FOREIGN PATENT DOCUMENTS

JP 2000-105203 A 4/2000
JP 2001-148017 A 5/2001
(Continued)

OTHER PUBLICATIONS

Search Report mailed Mar. 1, 2022 in International Application No. PCT/JP2021/048007.
(Continued)

*Primary Examiner* — Hina F Ayub
(74) *Attorney, Agent, or Firm* — Miles & Stockbridge, P.C.

(57) ABSTRACT

An optical-type foreign matter inspection device that inspects a foreign matter on a surface of a sample includes a rotary stage that is driven to rotate and on which the sample is placed, a laser light source configured to irradiate the surface of the sample with a laser beam, variable optical attenuators of two or more stages configured to adjust a light amount of the laser beam, a sensor configured to detect light scattered or reflected from the surface of the sample, an A/D conversion circuit configured to convert an intensity of light received by the sensor into a digital pixel based on an output signal of the sensor, a data processor configured to receive an output signal of the A/D conversion circuit and coordinate information output from the rotary stage and associate (Continued)

the coordinate information with the output signal of the A/D conversion circuit to output the associated information as detection data, and an attenuator controller configured to control transmittances of the variable optical attenuators based on the coordinate information.

20 Claims, 11 Drawing Sheets

(52) U.S. Cl.
CPC .................. *G01N 2201/021* (2013.01); *G01N 2201/06113* (2013.01); *G01N 2201/0636* (2013.01)

(58) Field of Classification Search
CPC ... G01N 2201/021; G01N 2201/06113; G01N 2201/0636
See application file for complete search history.

(56) References Cited

U.S. PATENT DOCUMENTS

| | | | | | |
|---|---|---|---|---|---|
| 8,294,887 | B1* | 10/2012 | Biellak | .............. | G01N 21/9501 356/237.4 |
| 2007/0268484 | A1 | 11/2007 | Matsui | | |
| 2008/0007725 | A1* | 1/2008 | Togashi | ............. | G01N 21/9501 356/237.2 |
| 2008/0151235 | A1* | 6/2008 | Oshima | .............. | G01N 21/9501 356/237.4 |
| 2008/0225298 | A1* | 9/2008 | Fairley | ............. | G01N 21/95607 356/445 |
| 2008/0304069 | A1 | 12/2008 | Wolters et al. | | |
| 2009/0323052 | A1 | 12/2009 | Silberstein et al. | | |
| 2013/0114078 | A1 | 5/2013 | Honda et al. | | |
| 2013/0277553 | A1* | 10/2013 | Otani | ................. | G01N 21/8806 250/306 |
| 2014/0009755 | A1* | 1/2014 | Shibata | .............. | G01N 21/8806 356/237.5 |
| 2015/0226665 | A1* | 8/2015 | Weidmann | ................ | G01J 3/42 356/437 |

FOREIGN PATENT DOCUMENTS

| | | | |
|---|---|---|---|
| JP | 2007-309713 | A | 11/2007 |
| JP | 2010-529461 | A | 8/2010 |
| JP | 2011-525985 | A | 9/2011 |
| JP | 2011-252841 | A | 12/2011 |
| WO | 2008154385 | A1 | 12/2008 |
| WO | 2009156981 | A1 | 12/2009 |

OTHER PUBLICATIONS

Written Opinion mailed Mar. 1, 2022 in International Application No. PCT/JP2021/048007.

* cited by examiner

STAGE ENCODER SIGNAL 127

COUNT VALUE 410
(STAGE COORDINATES)

$r_1$ $r_2$ $r_3$ $r_4$ $r_5$ $r_6$ $r_7$ $r_8$ $r_9$ $r_{10}$ $r_{11}$ $r_{12}$ (a) SIMULTANEOUS CONTROL

CONTROL PULSE 125a

CONTROL PULSE 125b

TRANSMITTANCE
(TOTAL)

0.2%    0.7%    1.2%

(b) ALTERNATE CONTROL

CONTROL PULSE 125a

CONTROL PULSE 125b

TRANSMITTANCE
(TOTAL)

0.2%    0.45%    0.7%    1.0%    1.2%

TIME

SETTLING TIME Ts

TRANSMITTANCE

TIME

INPUT CONTROL PULSE

160

<u>160</u>

(a) WITHOUT VOLTAGE VARIABLE CONTROL
(FIXED EXTINCTION RATIO)

(b) WITH VOLTAGE VARIABLE CONTROL
(VARIABLE EXTINCTION RATIO)

OPTICAL-TYPE FOREIGN MATTER INSPECTION DEVICE

TECHNICAL FIELD

The present invention relates to an optical-type foreign matter inspection device.

BACKGROUND ART

As background art of the present technique, there is PTL 1. PTL 1 discloses that "[Problem] An optical-type inspection device that irradiates an object to be inspected with light, detects light reflected or scattered on the object to be inspected, and inspects a foreign matter, a defect, or the like on the object to be inspected includes a mechanism that moves light to be radiated or the object to be inspected and that performs scanning in order to inspect an entire surface of the object to be inspected. In such an optical-type inspection device, when inspection throughput is regarded as important, there is a problem that detection sensitivity is lower in an outer peripheral portion than in an inner peripheral portion of the object to be inspected. [Solution] Even in the outer peripheral portion of the object to be inspected where a stage linear speed is not desired to be reduced, a decrease in an effective total signal amount of a scattered light signal is compensated by increasing illuminance of an illumination spot with respect to the inner peripheral portion while keeping a temperature rise of the surface of the object to be inspected constant." (see Abstract).

In the foreign matter inspection device disclosed in PTL 1, in an inspection method in which a rotational movement is performed in main scanning and a translational movement is performed in sub-scanning, it is possible to compensate a decrease in the signal amount of the scattered light signal by increasing the illuminance of the illumination spot with respect to the inner peripheral portion while keeping the temperature rise of the surface of the object to be inspected constant.

CITATION LIST

Patent Literature

PTL 1: JP2007-309713A

SUMMARY OF INVENTION

Technical Problem

However, in an optical-type foreign matter inspection device that rotates a sample in the related art, there is a problem that it is difficult to make a laser irradiation energy density on an entire inspection region of the sample uniform.

PTL 1 does not mention a ratio of changing the illuminance of the illumination. When the irradiation energy density is uniform from an inner periphery to an entire outer periphery of the object to be inspected (for example, a wafer of 300 mm), illuminance in the outer periphery needs to be 50 times or more illuminance in the inner periphery, but a transmittance of a variable optical attenuator with adjusted illuminance is about 5% to 95%. Therefore, it is impossible to adjust the illuminance over the entire surface of the object to be inspected with an adjustment ratio of about 20 times.

The invention has been made to solve such a problem, and an object of the invention is to make a laser irradiation energy density on an entire surface of an inspection region of a sample more uniform in an optical-type foreign matter inspection device that rotates the sample.

Solution to Problem

An example of an optical-type foreign matter inspection device according to the invention is an optical-type foreign matter inspection device that inspects a foreign matter on a surface of a sample, and the optical-type foreign matter inspection device includes:

a rotary stage that is driven to rotate and on which the sample is placed;

a laser light source configured to irradiate the surface of the sample with a laser beam;

variable optical attenuators of two or more stages configured to adjust a light amount of the laser beam;

a sensor configured to detect light scattered or reflected from the surface of the sample;

an A/D conversion circuit configured to convert an intensity of light received by the sensor into a digital pixel based on an output signal of the sensor;

a data processor configured to receive an output signal of the A/D conversion circuit and coordinate information output from the rotary stage and associate the coordinate information with the output signal of the A/D conversion circuit to output the associated information as detection data; and an attenuator controller configured to control transmittances of the variable optical attenuators based on the coordinate information.

ADVANTAGEOUS EFFECTS OF INVENTION

According to the optical-type foreign matter inspection device of the invention, the laser irradiation energy density on the entire inspection region of the sample can be made more uniform in the optical-type foreign matter inspection device that rotates the sample.

DESCRIPTION OF EMBODIMENTS

Figure 1:
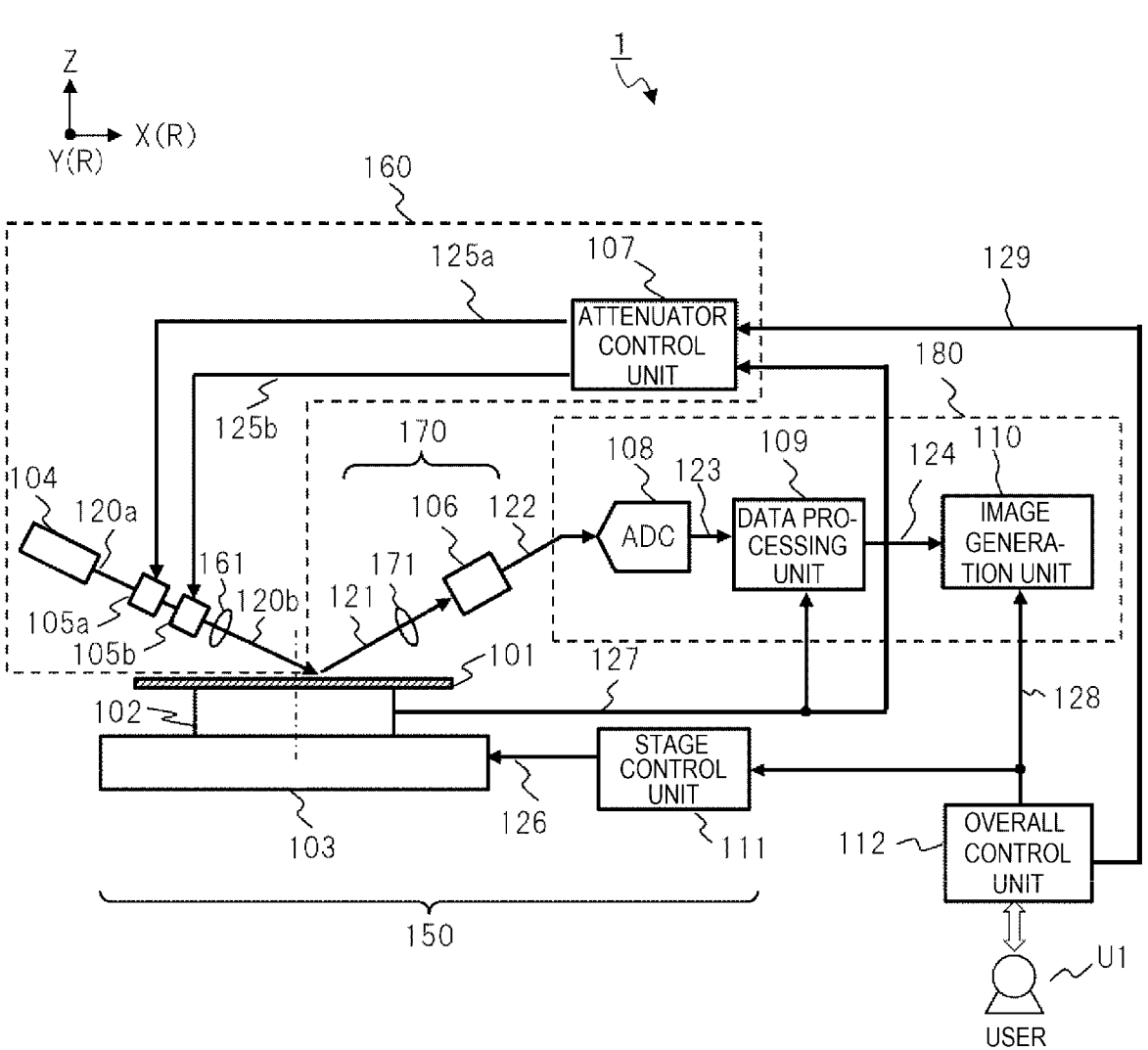
FIG. 1 shows a configuration of an optical-type foreign matter inspection device according to Embodiment 1 of the invention.

Hereinafter, embodiments of the invention will be described in detail with reference to the drawings. In the drawings, the same components are denoted by the same reference numerals in principle, and repeated description thereof is omitted. When there are a plurality of identical or similar components, the same reference numerals may be assigned with different subscripts. In the drawings, expressions of each component may not represent an actual position, size, shape, range, and the like in order to facilitate understanding of the invention, and the invention is not necessarily limited to the position, size, shape, range, and the like disclosed in the drawings. Expressions such as identification information, an identifier, an ID, a name, and a number of various kinds of data and information can be mutually replaced.

For the sake of description, in the case of describing processing executed by a program, a program, a function, a processing unit, and the like may be described as a main body, but a main body of hardware thereof is a processor, or a controller, a device, a computer, a system or the like implemented by a processor. The computer executes processing according to a program read onto a memory by a processor while appropriately using resources such as a memory and a communication interface. Accordingly, a predetermined function, processing unit, and the like are achieved.

The processor is implemented by a semi-conductor device such as a CPU or a GPU, and may be implemented by another semi-conductor device. The processor is implemented by a device or a circuit capable of performing a predetermined calculation. Processing can be executed not only by a software program but also by a dedicated circuit. The dedicated circuit may be an FPGA, an ASIC, or the like. The program may be installed as data in a target computer in advance, or may be distributed as data from a program source to a target computer and installed. The program source may be a program distribution server on a communication network or a non-transitory computer-readable storage medium. The program may include a plurality of program modules. A computer system may include a plurality of devices.

Embodiment 1

An optical-type foreign matter inspection device according to Embodiment 1 of the invention will be described with reference to FIGS. 1 and 2. The optical-type foreign matter inspection device according to Embodiment 1 is a device that inspects a foreign matter on a surface of a sample, and has a function of performing a foreign matter inspection on a semi-conductor wafer serving as an example of the sample. A computer system in Embodiment 1 is a computer system constituting the optical-type foreign matter inspection device according to Embodiment 1.

The optical-type foreign matter inspection device according to Embodiment 1 includes the following components.

Stage moving unit configured to rotate and translate a sample and output rotation angle information Irradiation unit configured to irradiate a surface of the sample with a laser beam Light adjustment unit configured to individually control variable optical attenuators of multiple stages and adjust laser power according to a linear speed at an irradiation position Detection unit configured to detect scattered light generated from the surface of the sample due to irradiation by the irradiation unit and output a detection signal Image generation unit configured to generate and output an image mapped on a sample surface In Embodiment 1, an example will be described in which a power density of a laser beam 120*b* on the surface of the sample in an inspection period is made constant by controlling a plurality of variable optical attenuators 105 according to a linear speed at a laser irradiation position of a sample 101 shown in FIG. 1.

[Optical-Type Foreign Matter Inspection Device]

FIG. 1 shows a configuration of an optical-type foreign matter inspection device 1 according to Embodiment 1. The optical-type foreign matter inspection device 1 according to Embodiment 1 includes the following components.

Stage 150 (including a rotary stage 102, a translation stage 103, and a stage control unit 111)

Illumination optical system 160 (including a laser light source 104, the plurality of variable optical attenuators 105, an attenuator control unit 107, and a lens 161)

Detection optical system 170 (including a sensor 106 and a lens 171)

Processing system 180 (including an A/D conversion circuit 108, a data processing unit 109, and an image generation unit 110)

Overall control unit 112

The stage 150 is a mechanism including the rotary stage 102, the translation stage 103, and the stage control unit 111.

The rotary stage 102 is driven to rotate and the sample 101 is placed on the rotary stage 102. A semiconductor wafer or the like serving as the sample 101 is placed and held on an upper surface of the rotary stage 102. The rotary stage 102 is rotated in a horizontal plane (an X-Y plane) with a Z direction (for example, a vertical direction) in the drawing as a rotation axis.

The translation stage 103 translates the sample 101 and the rotary stage 102 in a radial direction R (for example, an X direction or a Y direction).

The stage control unit 111 drives and controls the rotary stage 102 and the translation stage 103 based on a motor control signal 126 (in other words, a stage drive signal) under the control of the overall control unit 112, thereby causing the rotary stage 102 to rotate and the translation stage 103 to translate. Examples of an implementation configuration of the stage control unit 111 include a general-purpose circuit or a computer including a processor such as a central processing unit (CPU), and a dedicated circuit such as a field-programmable gate array (FPGA).

The illumination optical system 160 includes the laser light source 104, the plurality of variable optical attenuators 105 (of two or more stages), the attenuator control unit 107 (in other words, an attenuator controller), and the lens 161.

The laser light source 104 emits a laser beam (in other words, laser light) 120*a*. Transmittances of the plurality of variable optical attenuators 105 are controlled by the attenuator control unit 107, thereby adjusting a light amount of the laser beam 120*b* to be transmitted. The lens 161 condenses and forms an image of the emitted laser beam 120*b* on a target position of the sample 101. In this manner, the laser light source 104 irradiates a surface of the sample 101 with the laser beam 120b.

The variable optical attenuator 105 may have various types of configurations, and the configuration of the variable optical attenuator 105 is not limited. In the present embodiment, the variable optical attenuator 105 having a ½ wavelength plate and a polarized beam splitter is used. Although all of the variable optical attenuators 105 have such a configuration in the present embodiment, at least one variable optical attenuator 105 may have a ½ wavelength plate and a polarized beam splitter, and the other variable optical attenuators 105 may have different configurations.

Examples of an implementation configuration of the attenuator control unit 107 include a general-purpose circuit or a computer including a processor such as a central processing unit (CPU), and a dedicated circuit such as a field-programmable gate array (FPGA).

The detection optical system 170 includes the lens 171 and the sensor 106. The lens 171 condenses and forms an image of scattered light 121 generated from the surface of the sample 101 irradiated with the laser beam 120b by the illumination optical system 160. The sensor 106 is an accumulated charge type sensor that detects the scattered light 121 condensed and imaged by the lens 171 and outputs a sensor output (in other words, a sensor output signal) 122. The sensor 106 is implemented by, for example, a CMOS sensor or a CCD sensor. As described above, the sensor 106 detects light scattered or reflected from the surface of the sample 101.

The processing system 180 includes the A/D conversion circuit 108, the data processing unit 109, and the image generation unit 110. The processing system 180 is implemented as, for example, a computer system. The computer system includes a processor, a memory, a communication interface, an input and output interface, a bus, and the like. A part of the processing system 180 may be implemented by a dedicated circuit. The data processing unit 109, the image generation unit 110, the stage control unit 111, and the like may be implemented as a dedicated circuit such as an FPGA, thereby executing high-speed processing.

The A/D conversion circuit 108 samples the sensor output 122, performs analog to digital conversion, and outputs an ADC output 123 (in other words, an output signal of an ADC conversion circuit). The ADC output 123 is digital pixel information corresponding to elements arranged in a two-dimensional array of the sensor 106, and has a value corresponding to a light intensity or the like for each pixel. In this manner, the A/D conversion circuit 108 converts an intensity of light received by the sensor 106 into digital pixels based on the sensor output 122.

In a determination related to detection of a foreign matter in the processing system 180, it is only necessary to determine whether a foreign matter is present by a method such as comparison with a threshold with reference to a signal value corresponding to a pixel, and details are not limited.

The data processing unit 109 (in other words, a data processor) executes data processing of associating rotation angle information with the ADC output 123 based on the ADC output 123 and a stage encoder signal 127 from the rotary stage 102, and outputting the associated information as detection data 124. The stage encoder signal 127 is a signal representing a rotation angle of the rotary stage 102, coordinates of the translation stage 103, and the like, and can be regarded as coordinate information.

In this manner, the data processing unit 109 receives the ADC output 123 and the coordinate information output from the rotary stage 102, associates the coordinate information with the ADC output 123, and outputs the associated information as the detection data 124. The attenuator control unit 107 controls the transmittance of the variable optical attenuator 105 based on the coordinate information.

The image generation unit 110 generates and outputs, as an image (also referred to as a mapping image), position coordinates of a foreign matter or the like on the sample 101 based on the detection data 124 and foreign matter coordinate information (not shown). The output is, for example, display on a display screen of a display device built in or connected to the processing system 180. The foreign matter coordinate information or corresponding information can be acquired from the stage 150, the stage control unit 111, or the overall control unit 112.

Examples of an implementation configuration of components of units such as the data processing unit 109 and the image generation unit 110 in the processing system 180 include a processor and a dedicated circuit. The units may be individually implemented, or may be integrated and implemented. For example, the overall control unit 112 and units of the processing system 180 excluding the A/D conversion circuit 108 may be integrally implemented as one computer system.

The overall control unit 112 controls the entire optical-type foreign matter inspection device 1. The overall control unit 112 has a function of outputting inspection information 128 including a rotation speed, a translation speed, and the like to the image generation unit 110 and the stage control unit 111, a function of outputting transmittance adjustment information of the variable optical attenuator 105 to the attenuator control unit 107, and the like.

When the variable optical attenuator 105 includes a ½ wavelength plate and a polarized beam splitter, it is necessary to output angle information of the wavelength plate, which is an example of an attenuator control value 125. In this case, it is preferable to refer to an angle and transmittance conversion amount for setting the transmittance to a predetermined value. An example of the transmittance adjustment information includes a conversion table.

Examples of an implementation configuration of the overall control unit 112 include a computer system including a processor or a controller, and a dedicated circuit such as an FPGA.

A user U1 is an operator who operates and uses the optical-type foreign matter inspection device 1. The user U1 inputs an instruction, inputs a setting, confirms an image, confirms information, and the like via an input device or an output device (including a display device) (not shown) connected to the overall control unit 112, and performs work related to a foreign matter inspection. The user U1 may access a computer system of the optical-type foreign matter inspection device 1 from a client terminal device to use functions of the optical-type foreign matter inspection device 1. That is, the computer system may be implemented by a client server system or the like. The optical-type foreign matter inspection device 1 may read various kinds of data from and write various kinds of data to an external device (for example, a server).

For example, the client terminal device of the user U1 accesses the computer system (for example, the overall control unit 112 or the image generation unit 110) of the optical-type foreign matter inspection device 1, acquires screen data including a GUI from the computer system, and displays the screen data on a display screen. The user U1 inputs information of an instruction or a setting to the screen including the GUI, and the client terminal device transmits the information to the computer system. The computer system controls an operation related to a foreign matter inspection based on the information from the client terminal device, and transmits screen data including a mapping image of an inspection result and a GUI to the client terminal device. The client terminal device displays the screen, and the user U1 can view and check the screen.

[Necessity of Laser Power Adjustment]

Figure 2:
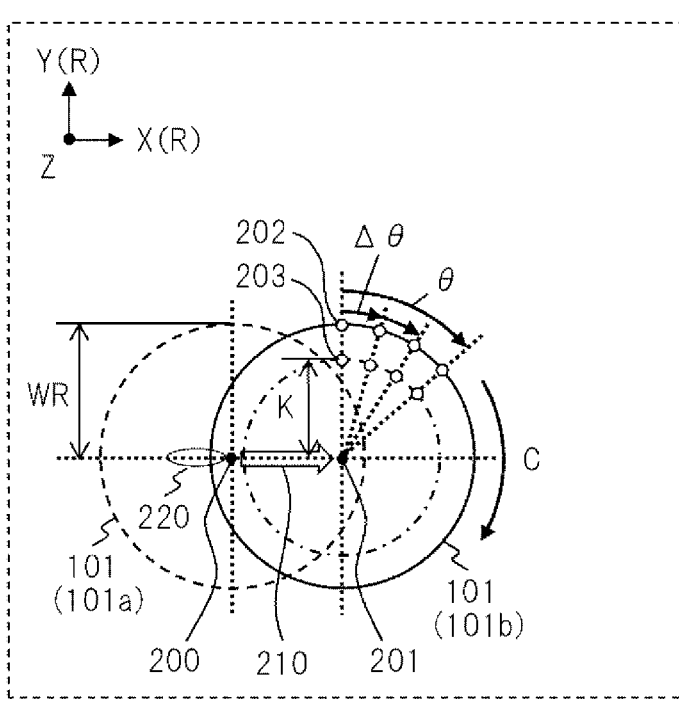
FIG. 2 shows a basic configuration of translation and rotation of a stage in Embodiment 1.

FIG. 2 shows a basic configuration related to translation and rotation on the upper surface of the sample 101 on the stage 150 in the X-Y plane.

A square outer frame indicated by a broken line in FIG. 2 represents a region fixed to the optical-type foreign matter inspection device 1 (as a more precise example, a housing or a main body). First, the sample 101 is disposed at a position 101a before a translational movement, and an outer shape of the position 101a is indicated by a broken line circle. The sample 101 has a wafer radius WR. A center point of a disk formed by the sample 101 coincides with a reference position 200. The reference position 200 represents a rotation center of the rotary stage 102.

A translational movement 210 of the sample 101 from the position 101a to the right, for example in the X direction is performed by the translation stage 103. Accordingly, the sample 101 is moved to a position 101b after the translational movement, and an outer shape of the position 101b is indicated by a solid line circle. Along with the movement, the reference position is also moved, and a reference position corresponding to the position 101b becomes a reference position 201.

At the position 101b, for example, a position 202 of an outer periphery of the sample and a position 203 inside the position 202 are examples of reference positions (reference angles) of rotation in a circumferential direction. For example, rotation is performed by the rotary stage 102 with a circumferential direction C which is clockwise in the drawing from the position 203 as an inspection direction. A rotation angle θ is an angle corresponding to a rotational movement, and Δθ represents a unit rotation angle.

An irradiation position of the laser beam 120b is fixed to a laser beam irradiation position 220. Although a shape is elliptical in FIG. 2, the shape and a spot diameter are not limited thereto. Along with rotation of the sample 101 at the position 101b, the laser beam 120b is sequentially radiated in time series to different positions in the circumferential direction C on the sample 101. Although FIG. 2 shows that the irradiation position moves in the circumferential direction C, the irradiation position of the laser beam 120b is actually fixed to the optical-type foreign matter inspection device 1, and a plurality of positions in the circumferential direction are irradiated with the laser beam 120b as the sample 101 rotates.

Further, a radius of a circumference of an object to be inspected can be changed in the radial direction R as indicated by a distance K (a corresponding radius) by performing a translational movement, for example, in the X direction by the translation stage 103. For example, a position on a circumference including the position 203 can be inspected by translating the sample 101 and the reference position in the X direction by a distance corresponding to a radius of the circumference including the position 203 and then rotating the sample 101 around the reference position.

In this manner, scattered light over the entire surface of the sample 101 is detected to detect a foreign matter or the like on the sample by an operation of changing a circumferential radius of the object to be inspected by a translational movement in the X direction and an operation of rotating the sample 101 around the reference position.

Here, it can be seen that when a position of the laser beam irradiation position 220 relative to the sample 101 is changed by rotation and translation, a laser beam irradiation time per unit area changes according to a rotation speed and a translation position. That is, an irradiation energy density changes.

When the irradiation energy density is different in the surface of the sample, an amount of scattered light is affected, and as a result, a size or the like of a foreign matter that can be detected varies. As shown in FIG. 2, when a rotation angular speed of the sample 101 is constant, a movement amount per unit time is larger (a linear speed is larger) toward an outer periphery, and when laser power is constant, the irradiation energy density of the irradiated laser beam 120b is lower toward the outer periphery.

In order to prevent such a problem, in a technique in the related art, there is an inspection method in which even when laser power is constant, a rotation speed of the sample 101 is reduced as the laser beam irradiation position 220 moves to the outer periphery to keep a linear speed constant and keep the irradiation energy density constant. However, since the rotation speed is gradually reduced in such a method, the method becomes a low-speed inspection method in which an inspection time is increased.

On the other hand, in a high-speed inspection such as an inspection in which the rotation speed is constant or an acceleration and deceleration inspection in which an inspection is performed including an acceleration and a deceleration of the rotation of the sample 101, it is preferable to adjust the laser power according to the linear speed in order to make the irradiation energy density constant on the entire surface of the sample.

As shown in FIG. 1, the stage encoder signal 127 is input to the attenuator control unit 107, and the plurality of variable optical attenuators 105 are controlled based on a linear speed that can be calculated from the stage encoder signal 127, so that the irradiation energy density on the entire surface of the sample can be made constant.

[Calculation of Laser Power Adjustment Range]

In order to adjust the laser power, how much adjustment range (for example, represented by a maximum light amount and a minimum light amount) is required is calculated. A linear speed $v$ at the laser beam irradiation position 220 satisfies $v = r \times \omega$, in which $r$ is a radius and $\omega$ is a sample rotation angular speed. Therefore, in the case of an inspection at a constant rotation speed, the linear speed increases in proportion to a radial position.

The irradiation energy density is inversely proportional to the linear speed in consideration of an irradiation energy amount per rotation. Therefore, in the case of an inspection in which a rotation speed is constant as a result, a constant irradiation energy density can be achieved by increasing the laser power in proportion to a laser irradiation radius.

Here, for example, when a wafer having a diameter of 300 mm is considered as the sample 101 to be inspected, a translational movement amount required for inspecting the entire surface of the wafer is 150 mm (that is, a radius) from a center position to an outer periphery of the wafer in a simple calculation. Assuming that a range of an inspection position is 2 mm to 148 mm in consideration of a spot diameter on the irradiated wafer surface of the laser beam 120b, a laser power adjustment range of about 148/2=74 times as described above is required. In addition, in the case of an acceleration and deceleration inspection, since an inspection is performed when the rotation of the sample 101 is accelerated, it is necessary to adjust the laser power in a state where the rotation speed is low, that is, in a state where the linear speed is low, and a wider adjustment range is required.

In many variable optical attenuators currently commercialized, a transmittance adjustment range is about 5% to 95%, and the above laser power adjustment range cannot be satisfied with an adjustment width of about 95/5=19 times.

[Enlarging of Laser Power Adjustment Range by Plurality of Variable Optical Attenuators]

It will be described that the laser power adjustment range can be enlarged by the configuration shown in FIG. 1. In FIG. 1, the plurality of variable optical attenuators 105 are provided. For example, when there are two stages of variable optical attenuators 105, a range of the transmittance to be finally output is 5%×5%=0.25% to 95%×95%=90.25% based on the above-described transmittance, and the laser power adjustment range can be set to 90.25/0.25=361 times. With a configuration having the plurality of variable optical attenuators 105, it is possible to keep the irradiation energy density on the entire surface of the sample constant in a high-speed inspection, and it is possible to reduce an in-plane variation of a size of a foreign matter or the like.

Embodiment 2

A method of controlling variable optical attenuators according to Embodiment 2 will be described with reference to FIGS. 3 to 5. A basic configuration of an optical-type foreign matter inspection device according to Embodiment 2 is the same as or common to that in Embodiment 1. Hereinafter, a configuration portion different from that in Embodiment 1 or a more specific configuration will be described in Embodiment 2. In Embodiment 2, a specific control method capable of performing laser power adjustment with higher accuracy by the optical attenuators of multiple stages will be described.

[Attenuator Control]

Figure 3:
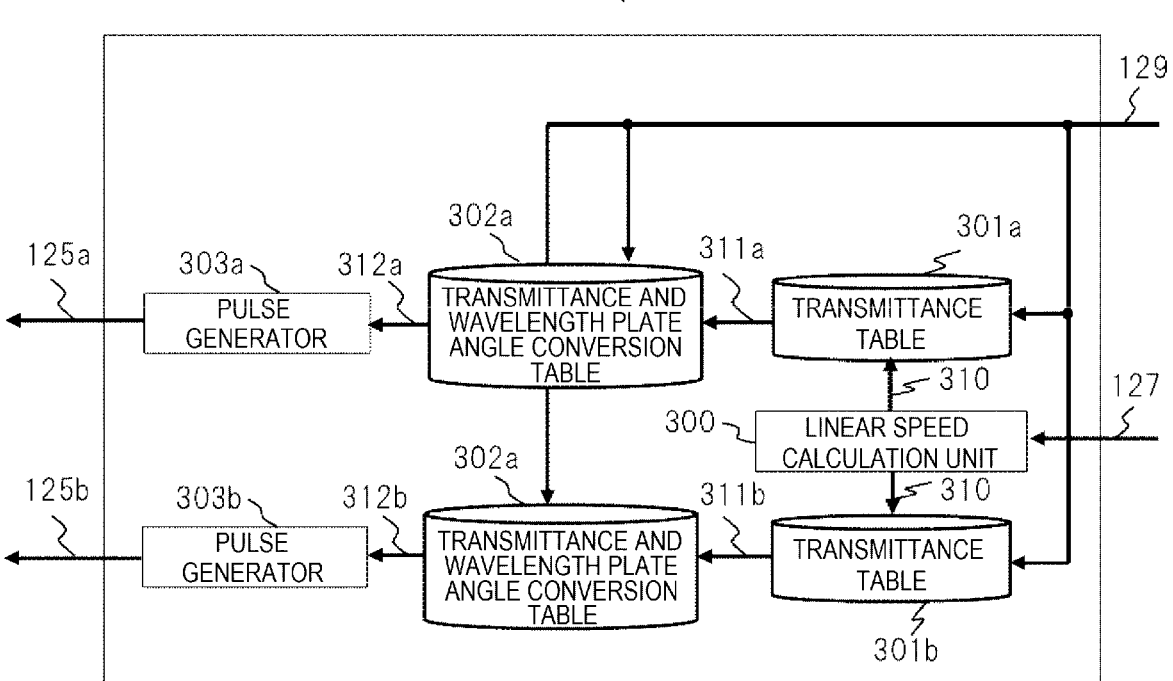
FIG. 3 shows a configuration example 1 of an attenuator control unit in Embodiment 2.

FIG. 3 shows a configuration example of the attenuator control unit 107 shown in FIG. 1. Here, in the configuration shown in FIG. 3, a control pulse is output as the attenuator control value 125 to the variable optical attenuator 105.

An angle of the ½ wavelength plate of the variable optical attenuator 105 can be changed by a stepping motor. The angle here refers to, for example, a rotation angle representing a rotation position in a plane orthogonal to laser. A servomotor may be used instead of the stepping motor. The ½ wavelength plate is rotated by a predetermined angle for each pulse input to the stepping motor, and the transmittance is determined according to the angle after the rotation.

Components shown in FIG. 3 will be described. In the attenuator control unit 107, first, table information 129 from the overall control unit 112 is input to a transmittance table 301 and a transmittance and wavelength plate angle conversion table 302. The transmittance table 301 is a table for recording a relationship between the transmittance and the linear speed for each variable optical attenuator 105, that is, a table for determining the transmittance of the variable optical attenuator 105 based on the linear speed.

The transmittance and wavelength plate angle conversion table 302 is a table for recording the angle of the ½ wavelength plate with respect to the transmittance, that is, a table for determining the angle of the ½ wavelength plate based on the transmittance.

It is preferable to record the tables before starting an inspection. Although it is referred to as a table here, substantial contents may be a function describing a relationship.

When an inspection is started, the stage encoder signal 127 is input from the stage 150 to a linear speed calculation unit 300 (in other words, a linear speed processor). The linear speed calculation unit 300 calculates a linear speed based on the stage encoder signal 127. The linear speed is expressed as, for example, linear speed information 310.

Based on the linear speed information 310, transmittance information 311 is input from the transmittance table 301 to the transmittance and wavelength plate angle conversion table 302, and angle information 312 is output to a pulse generator 303. The pulse generator 303 outputs a control pulse as the attenuator control value 125 to the stepping motor of the variable optical attenuator 105 based on the angle represented by the angle information 312. According to such a configuration, the transmittance of the variable optical attenuator 105 can be appropriately controlled according to the stage encoder signal 127 and the table information 129.

[Modification of Attenuator Control]

Figure 4:
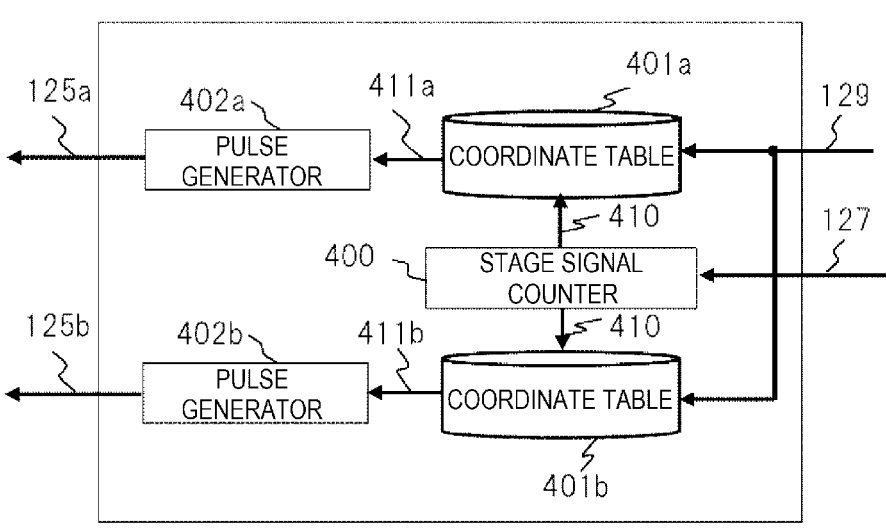
FIG. 4 shows a configuration example 2 of the attenuator control unit in Embodiment 2.

FIG. 4 shows a configuration of the attenuator control unit 107 that achieves attenuator control by simpler control.

In this configuration, first, one or more coordinates for outputting the attenuator control value 125 to the ½ wavelength plate are stored in a coordinate table 401 in advance based on the table information 129 from the overall control unit 112. When an inspection is started, a stage signal counter 400 counts the stage encoder signal 127 (for example, a pulsed signal) from the rotary stage 102. Then, the stage signal counter 400 outputs a count value 410 (equivalent to stage coordinates) representing an accumulated count number to the coordinate table 401.

When coordinates stored in the coordinate table 401 match the count value 410, the coordinate table 401 outputs a match signal 411 to a pulse generator 402. The pulse generator 402 outputs the attenuator control value 125 according to the match signal 411.

That is, the pulse generator 402 outputs a control pulse to the stepping motor when the count value 410 of the stage encoder signal 127 matches any one of the coordinates stored in the coordinate table 401. Accordingly, the ½ wavelength plate is rotated.

In this manner, the coordinates stored in the coordinate table 401 can be used as an angle change threshold, and when a rotation angle of the sample 101 matches the angle change threshold (one angle change threshold when a plurality of angle change thresholds are defined), the ½ wavelength plate is rotated. That is, the coordinate table 401 can be referred to as a table that stores one or more angle change thresholds for changing the angle of the ½ wavelength plate.

Transmittance control can be performed according to stage coordinates by this series of operations. As an inspection condition, generally, a rotation speed of a sample is determined with respect to stage coordinates, and a linear speed can be estimated from the stage coordinates, so that the transmittance may be determined with respect to stage coordinates. When a relationship between the transmittance and the wavelength plate angle is also included in the coordinate table 401, transmittance control equivalent to the transmittance control performed by the configuration shown in FIG. 3 can be performed with this configuration.

According to such a configuration, the transmittance of the variable optical attenuator 105 can be appropriately controlled according to the stage encoder signal 127 and the table information 129.

[Example in which Transmittance is Changed with High Accuracy by Independent Attenuator Control]

Since the variable optical attenuators 105 can be controlled independently with the configurations shown in FIGS. 3 and 4, a control method of changing the transmittance with high accuracy using the configurations will be described. To simplify description, the configuration shown in FIG. 4 will be described as an example.

Here, since there are two stages of variable optical attenuators 105, a total transmittance is obtained by multiplying transmittances of variable optical attenuators 105*a* and 105*b*. Therefore, when a predetermined total transmittance is determined with respect to stage coordinates (equivalent to a linear speed), a value obtained by taking a square root of the transmittance (an N-th root of the total transmittance in the case of N stages) is a transmittance to be achieved by each variable optical attenuator 105.

Therefore, a method of simultaneously controlling the variable optical attenuators 105 having the same transmittance and the same wavelength plate angle with respect to stage coordinates is a simple control method. A signal example in this control method is shown in (a) of FIG. 5. For example, wavelength plates are moved at timings $r_2$, $r_8$, and $r_{12}$ of the count value 410 representing stage coordinates, and the total transmittance is changed accordingly by moving all wavelength plates at the same time.

Figures 5, 6:
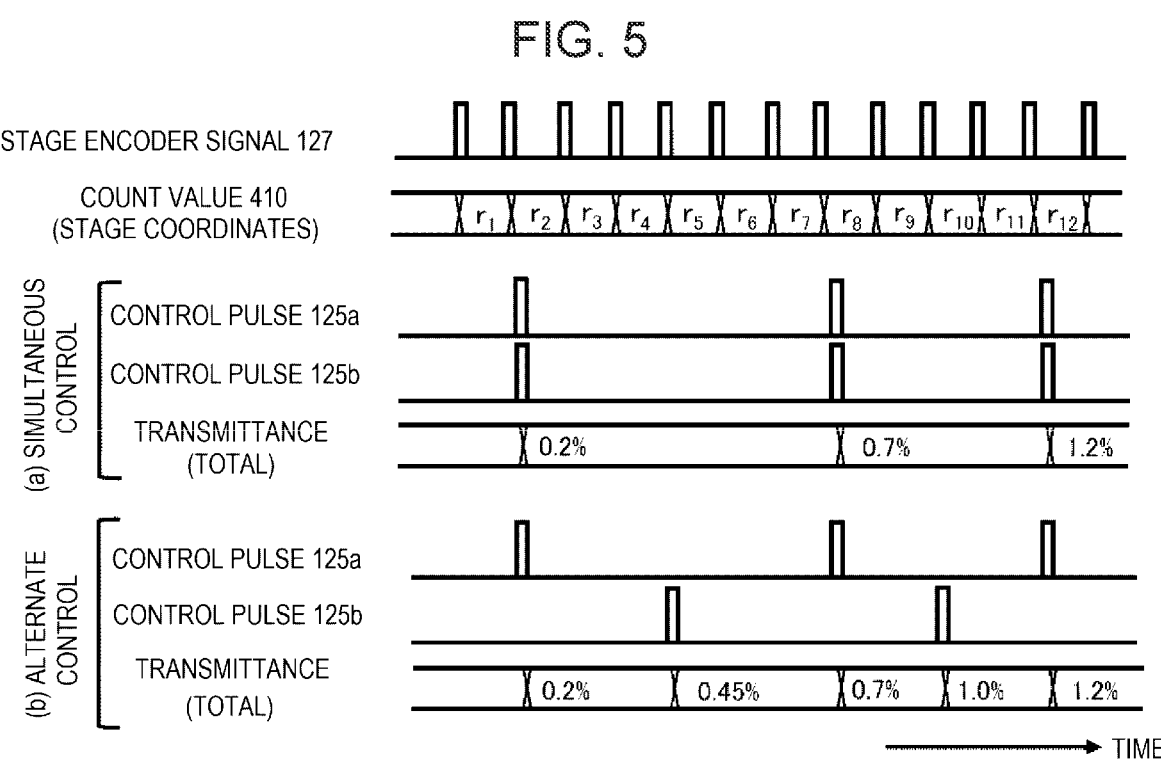
FIG. 5 shows an example in which resolution of a transmittance can be improved according to Embodiment 2.
FIG. 6 shows an overview of a settling time of a stepping motor that rotates a wavelength plate.

In contrast to this control method, a modification of the control method for increasing resolution of the transmittance is shown in (b) of FIG. 5. In this example, the attenuator control unit 107 has a function of sequentially and cyclically controlling the plurality of variable optical attenuators 105 independently of each other, in particular when there are two variable optical attenuators 105, the two variable optical attenuators 105 are controlled alternately.

The transmittance can be changed more smoothly by shifting pulse generation timings of an attenuator control value 125*a* and an attenuator control value 125*b* and alternately generating pulses. In order to achieve the timings, for example, the coordinate table 401 shown in (a) of FIG. 5 may be set as an initial value, and a median value of coordinates before and after outputting a control pulse (for example, $(r_1+r_2)/2$) may be set in a coordinate table 401*b*.

[Example in which Transmittance is Changed at High Speed by Independent Attenuator Control]

According to the control method shown in FIG. 5, there is an effect that the transmittance can be controlled not only with high resolution but also at a high speed. As shown in FIG. 6, the stepping motor that rotates the wavelength plate has a settling time until the transmittance is stabilized after an angle is moved by one step due to a physical structure of the stepping motor.

Figure 7:
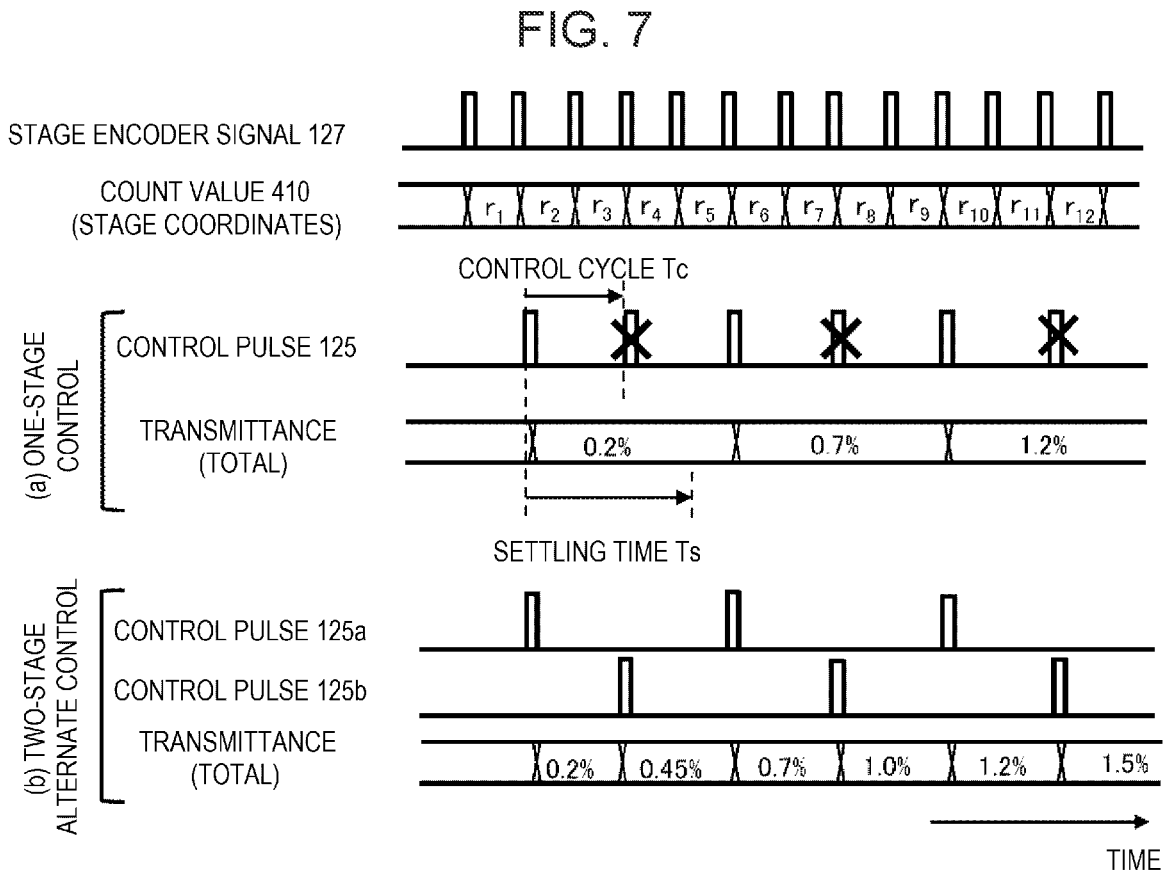
FIG. 7 shows an example in which the transmittance can be controlled at a high speed according to Embodiment 2.

(a) of FIG. 7 shows, as a reference example, a case where the variable optical attenuator 105 performs a high-speed inspection with one stage (for example, a rotation speed is increased). When an inspection speed is increased, an interval of control pulses (a control cycle Tc) is relatively shorter than that in a low-speed inspection, and when the interval is shorter than a settling time Ts, control cannot be performed.

In (b) of FIG. 7 according to a modification of the present embodiment, when the variable optical attenuator 105 performs two-stage alternate control, the control cycle Tc of each control pulse can be doubled as compared with the case of the one-stage control. Accordingly, laser power can be adjusted in a high-speed inspection by applying a plurality of variable optical attenuators 105 and alternate control. Although the number of stages of the variable optical attenuator 105 is two in the present embodiment, when the number of stages is three or more, the transmittance can be changed with higher accuracy and/or at a higher speed.

Embodiment 3

A maintenance method for variable optical attenuators according to Embodiment 3 will be described with reference to FIGS. 8 and 9. A basic configuration of an optical-type foreign matter inspection device according to Embodiment 3 is the same as or common to that in Embodiment 1 and the like. Hereinafter, a configuration portion different from that in Embodiment 1 or the like or a more specific configuration will be described in Embodiment 3. In Embodiment 3, a method of monitoring a deterioration state and effectively operating optical attenuators of multiple stages will be described.

[Configuration Having Laser Power Monitor]

Figure 8:
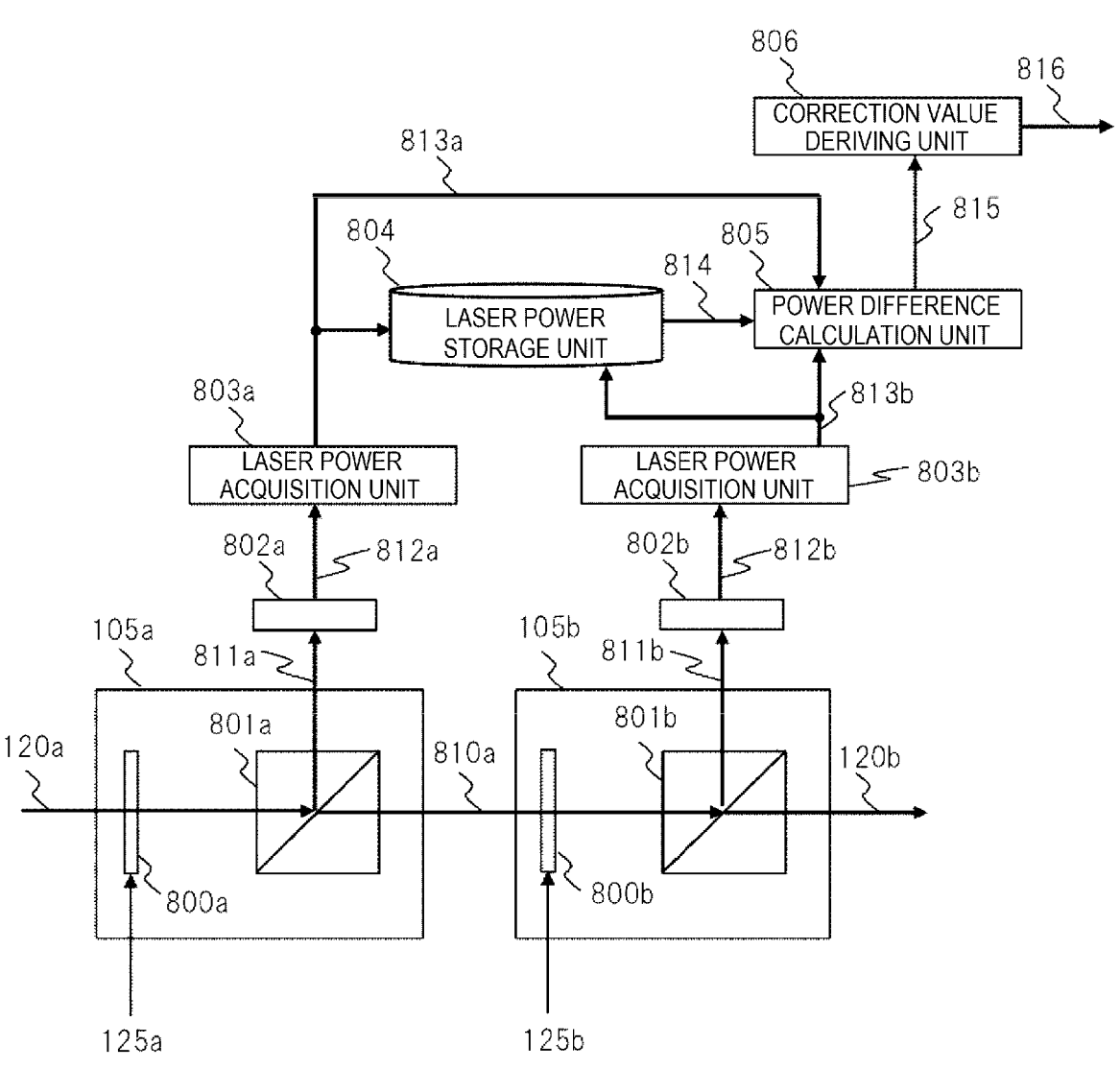
FIG. 8 shows a configuration example for improving maintainability of variable optical attenuators of multiple stages in Embodiment 3.

FIG. 8 shows a configuration for monitoring a deterioration state of the variable optical attenuator 105 in the present embodiment.

Similar to Embodiment 2 and the like, the variable optical attenuator 105 includes a ½ wavelength plate 800 and a polarized beam splitter 801, and a ratio of P polarized light 810 to S polarized light 811 changes according to an angle of the ½ wavelength plate 800.

In the present embodiment, a laser power monitor 802 is provided. The laser power monitor 802 measures laser power of laser reflected by the polarized beam splitter 801. When light used for an inspection is the P polarized light 810, the laser power monitor 802 is provided on a side close to the S polarized light 811, so that laser power can be measured non-invasively for the laser beam 120*b* used for an inspection.

A voltage signal 812 corresponding to laser power output from the laser power monitor 802 is acquired by a laser power acquisition unit 803 at any timing, and power information 813 is output to a laser power storage unit 804 (in other words, a laser power memory) or a power difference calculation unit 805 (in other words, a power difference calculation processor).

The power difference calculation unit 805 calculates a difference between measured laser power (represented by the power information 813) and predetermined reference laser power (represented by, for example, reference laser power information 814 from the laser power storage unit 804).

Here, the reference laser power can be determined by any method, and an example of a determination method will be described below. For example, when the optical-type foreign matter inspection device 1 is started up, laser power is measured by the laser power monitor 802 using laser emitted at specific reference laser power and the ½ wavelength plate 800 set at an angle corresponding to a specific reference transmittance. The laser power measured at this time can be stored as the reference laser power in the laser power storage unit 804.

The power difference calculation unit 805 calculates a difference between laser power measured for each ½ wavelength plate 800 and the reference laser power, and outputs difference information 815 representing the difference to a correction value deriving unit 806 (in other words, a correction value deriving processor).

The correction value deriving unit 806 derives a correction value of the transmittance of the variable optical attenuator 105 based on the difference information 815, and outputs correction value information 816 representing the correction value to the overall control unit 112 or the like.

The attenuator control unit 107 further controls the transmittance of the variable optical attenuator 105 based on the correction value.

[Effective Calibration of Variable Optical Attenuator Using Laser Power Information]

A calibration example of the variable optical attenuator 105 in the configuration shown FIG. 8 will be described with reference to FIG. 9. A calibration timing can be freely determined by the user U1. The reference laser power is acquired when the optical-type foreign matter inspection device 1 is started up or the like.

First, in step S900, laser power of the first-stage variable optical attenuator 105a is acquired. In step S901, a difference from previous power (reference laser power or laser power measured when a correction is performed immediately before) is calculated. A change amount (for example, a decrease amount) of the laser power is calculated based on the difference, and when the change amount exceeds a predetermined threshold, a correction value (a transmittance difference) for correcting the difference of the laser power is calculated in step S902.

Subsequently, in step S903, whether the correction value is within an adjustable range is determined. Here, step S903 is performed by, for example, the overall control unit 112. Whether the correction value is within the adjustable range can be determined based on whether the transmittance after correcting the transmittance difference falls below a predetermined transmittance lower limit. In this manner, the correction value can be applied to any variable optical attenuator 105.

For example, the correction value can be set in the transmittance table shown in FIG. 3, and can be expressed as an offset of transmittance for compensating a difference of laser power.

When the correction value falls out of the adjustable range, the first-stage variable optical attenuator 105a may be deteriorated or the laser light source 104 may be deteriorated, and accordingly, a replacement alert is output to the user U1 in step S904. When the correction value falls within the adjustable range, the correction value is applied in step S905.

When power of the first-stage variable optical attenuator 105a is not reduced in step S901, laser power of the second-stage variable optical attenuator 105b is acquired in step S906.

Steps S907 to S909 are executed in a similar manner to steps S901 to S903. When the correction value falls out of the adjustment range, it is determined that the second-stage variable optical attenuator 105b is deteriorated, and a replacement alert of the second-stage variable optical attenuator 105b is output to the user U1 in S910.

Figure 9:
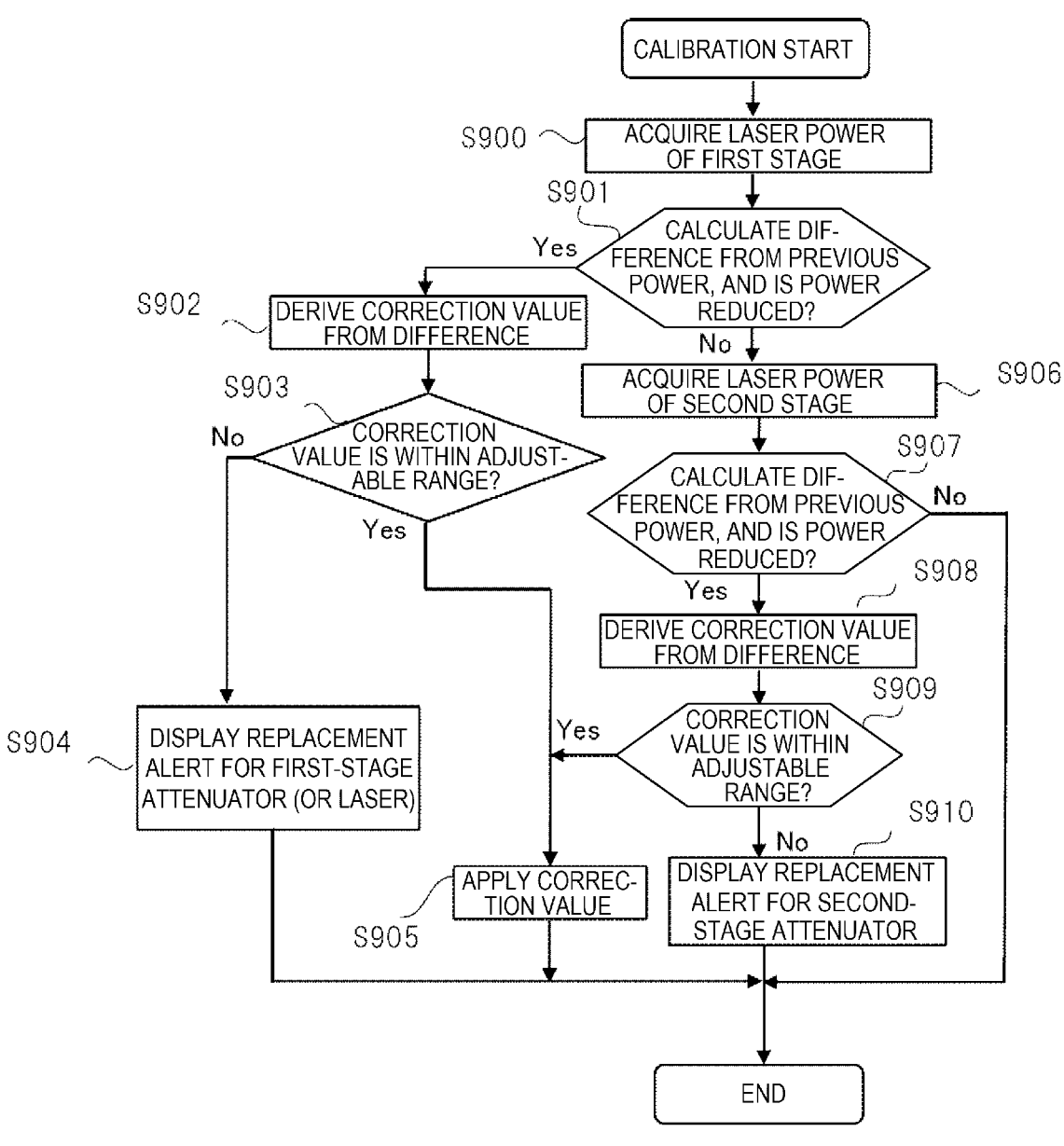
FIG. 9 shows an example of a calibration flow for improving the maintainability according to Embodiment 3.

These steps are a series of calibration flow, and by implementing the configuration shown in FIG. 8 and the calibration method shown in FIG. 9, it is possible to mutually correct the transmittance in the variable optical attenuators 105 of multiple stages and to reduce a component replacement frequency, and maintainability is improved by notifying the user U1 of a component replacement timing.

Embodiment 4

A data processing method for improving foreign matter detection accuracy according to Embodiment 4 will be described with reference to FIGS. 10 to 12.

A basic configuration of an optical-type foreign matter inspection device according to Embodiment 4 is the same as or common to that in Embodiment 1 and the like. Hereinafter, a configuration portion different from that in Embodiment 1 or the like or a more specific configuration will be described in Embodiment 4. In a configuration in which laser power is controlled over the entire surface of a sample, a method of preventing a decrease in detection accuracy even in an outer peripheral portion of the sample by making a threshold (a foreign matter threshold) of a scattered light amount for a foreign matter detection variable will be described in Embodiment 4.

[Threshold Control of Foreign Matter Detection]

Figure 10:
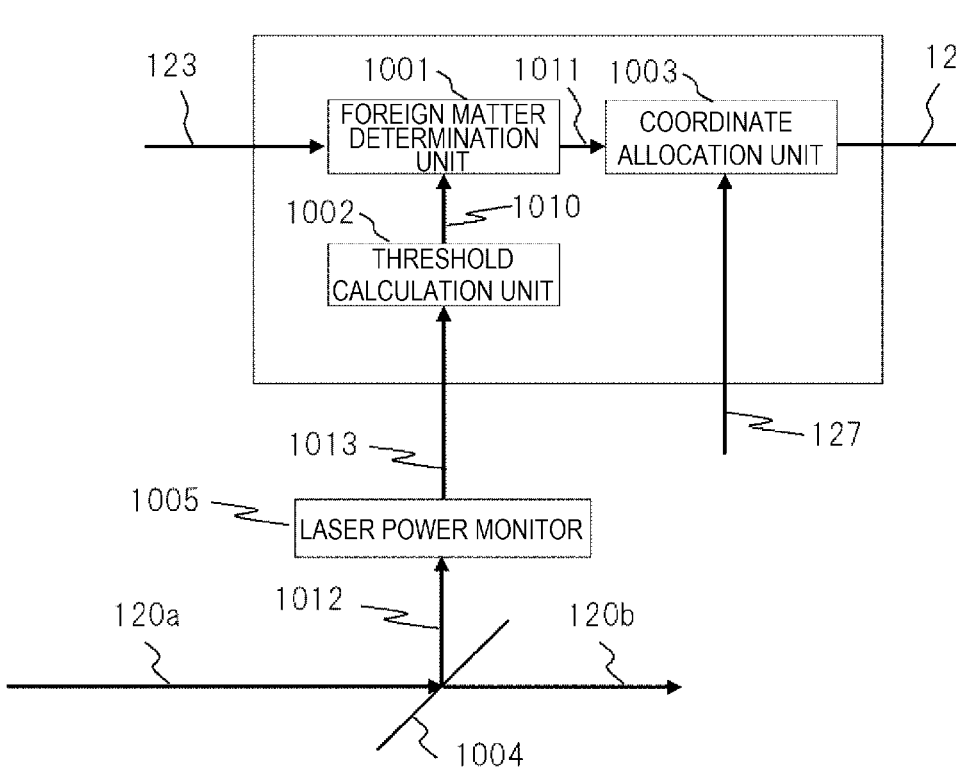
FIG. 10 shows a configuration example 1 related to a foreign matter determination in Embodiment 4.

FIG. 10 shows a configuration example of the data processing unit 109 shown in FIG. 1. The ADC output 123 obtained by converting a scattered light amount into a digital value is input to a foreign matter determination unit 1001 (in other words, a foreign matter determination processor). The foreign matter determination unit 1001 compares the ADC output 123 of the A/D conversion circuit 108 with a foreign matter threshold 1010, and outputs foreign matter information 1011 indicating whether a foreign matter is present. For example, when the ADC output 123 exceeds the foreign matter threshold 1010, it is determined that a foreign matter is present.

A coordinate allocation unit 1003 (in other words, a foreign matter coordinate processor) associates the stage encoder signal 127 with the foreign matter information 1011 and outputs the associated information as the detection data 124. The detection data 124 is output to the image generation unit 110.

In the related art, the foreign matter threshold 1010 is a fixed value, but in the present embodiment, the foreign matter threshold 1010 is dynamically changed. The optical-type foreign matter inspection device includes a half mirror 1004, and the half mirror 1004 reflects a part of laser beam radiated to the sample 101. A laser power monitor 1005 measures laser power 1013 of laser 1012 reflected by the half mirror 1004.

A threshold calculation unit 1002 (in other words, a threshold processor) determines the foreign matter threshold 1010 based on the laser power 1013. In this manner, the foreign matter threshold 1010 is dynamically changed.

According to such a configuration, a foreign matter can be appropriately detected by dynamically changing the foreign matter threshold 1010.

Although the half mirror 1004 is exemplified as a method of measuring the laser power 1013, it is needless to say that light not used for an inspection may be monitored by the polarized beam splitter 801 as shown in FIG. 8.

[Modification of Threshold Control]

Figure 11:
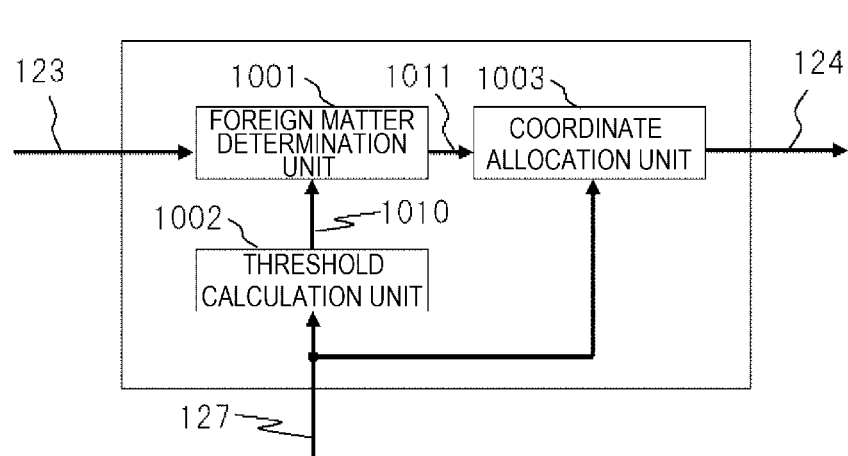
FIG. 11 shows a configuration example 2 related to the foreign matter determination in Embodiment 4.

FIG. 11 shows a modification of the data processing unit 109 shown in FIG. 10. When laser power corresponding to an inspection radius is known in advance as an inspection condition of a sample, a threshold can be controlled more simply by inputting the stage encoder signal 127 to the threshold calculation unit 1002.

Similar to the example shown in FIG. 10, the foreign matter determination unit 1001 compares the ADC output 123 of the A/D conversion circuit 108 with the foreign matter threshold 1010, and outputs the foreign matter information 1011 indicating whether a foreign matter is present. The threshold calculation unit 1002 determines the foreign matter threshold 1010 based on the stage encoder signal 127. Similar to the example shown in FIG. 10, the coordinate allocation unit 1003 associates the stage encoder signal 127 with the foreign matter information 1011 and outputs the associated information as the detection data 124.

According to such a configuration, a foreign matter can be appropriately detected by dynamically changing the foreign matter threshold 1010. Further, since the laser power monitor 1005 shown in FIG. 10 is not required, the configuration becomes simpler.

[Improvement of Detection Accuracy by Threshold Control]

Figure 12:
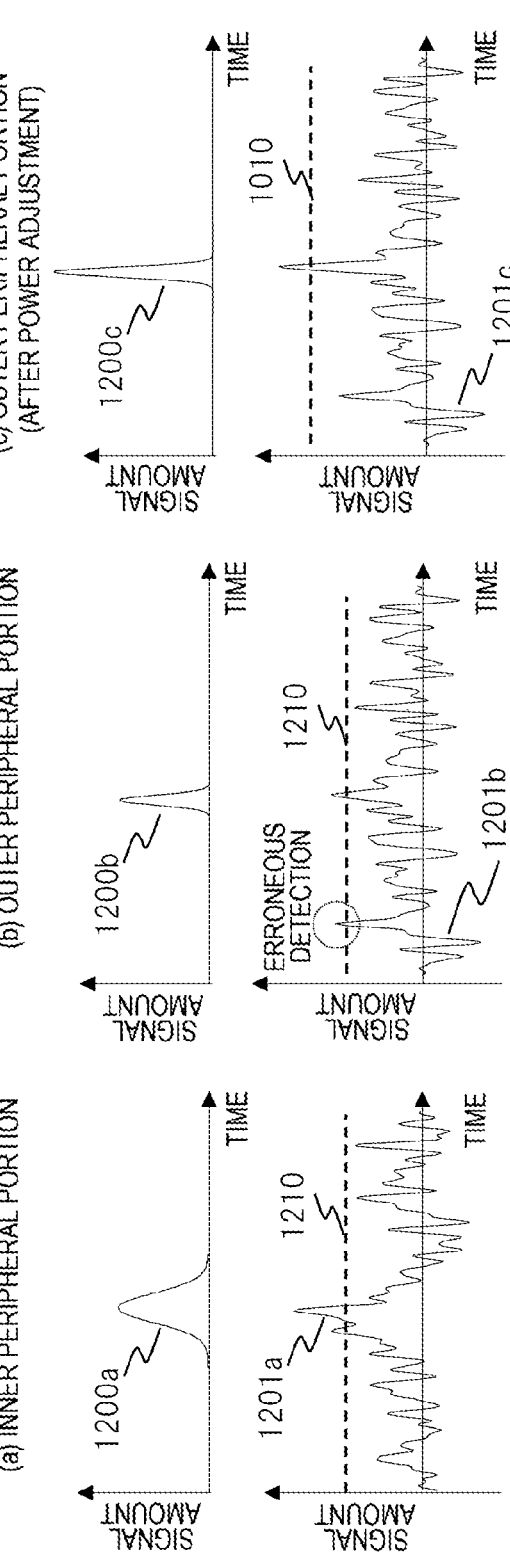
FIG. 12 shows an example of controlling a foreign matter threshold according to Embodiment 4.

FIG. 12 is a schematic diagram showing detection of a foreign matter according to a scattered light amount. When foreign matters having the same shape are inspected at an inner peripheral portion and an outer peripheral portion of a sample radius in an inspection in which a rotation speed of the sample is constant, a signal as shown in (a) of FIG. 12 is detected at the inner peripheral portion, and a signal as shown in (b) of FIG. 12 is detected at the outer peripheral portion. In FIG. 12, although an ideal signal amount 1200 is shown in an upper part, since there are actually optical noises caused by laser or the like or electric noises in an electric signal, a signal amount 1201 shown in a lower part is detected.

Since the linear speed is faster at the outer peripheral portion than the inner peripheral portion, a signal amount 1200b compressed in a time direction is detected. Since an amplitude of a signal amount 1200a of the inner peripheral portion and an amplitude of the signal amount 1200b of the outer peripheral portion are the same, a signal-to-noise ratio (hereinafter, an SN ratio) decreases in the outer peripheral portion where an integrated value in the time direction decreases, and as a result, an erroneous detection of a foreign matter occurs or a detection rate decreases.

According to the laser power control described in Embodiment 1, since an integrated value of the signal amount 1200 in the time direction can be controlled so as not to change between the inner periphery and the outer periphery, a signal amount 1200c having a large amplitude as shown in (c) of FIG. 12 can be obtained in the outer peripheral portion. Accordingly, even in a high-speed inspection in which a rotation speed is constant, the SN ratio which is sacrificed in the related art is improved.

Here, when a foreign matter threshold 1210 remains fixed, an amount of noises may increase due to an increase in laser power, and an erroneous detection may increase. Therefore, as in the present embodiment, the optimum foreign matter threshold 1010 as shown in (c) of FIG. 12 is set based on the laser power 1013 measured by the laser power monitor 1005, so that a true foreign matter can be detected and an erroneous detection can be reduced.

Embodiment 5

Figure 13:
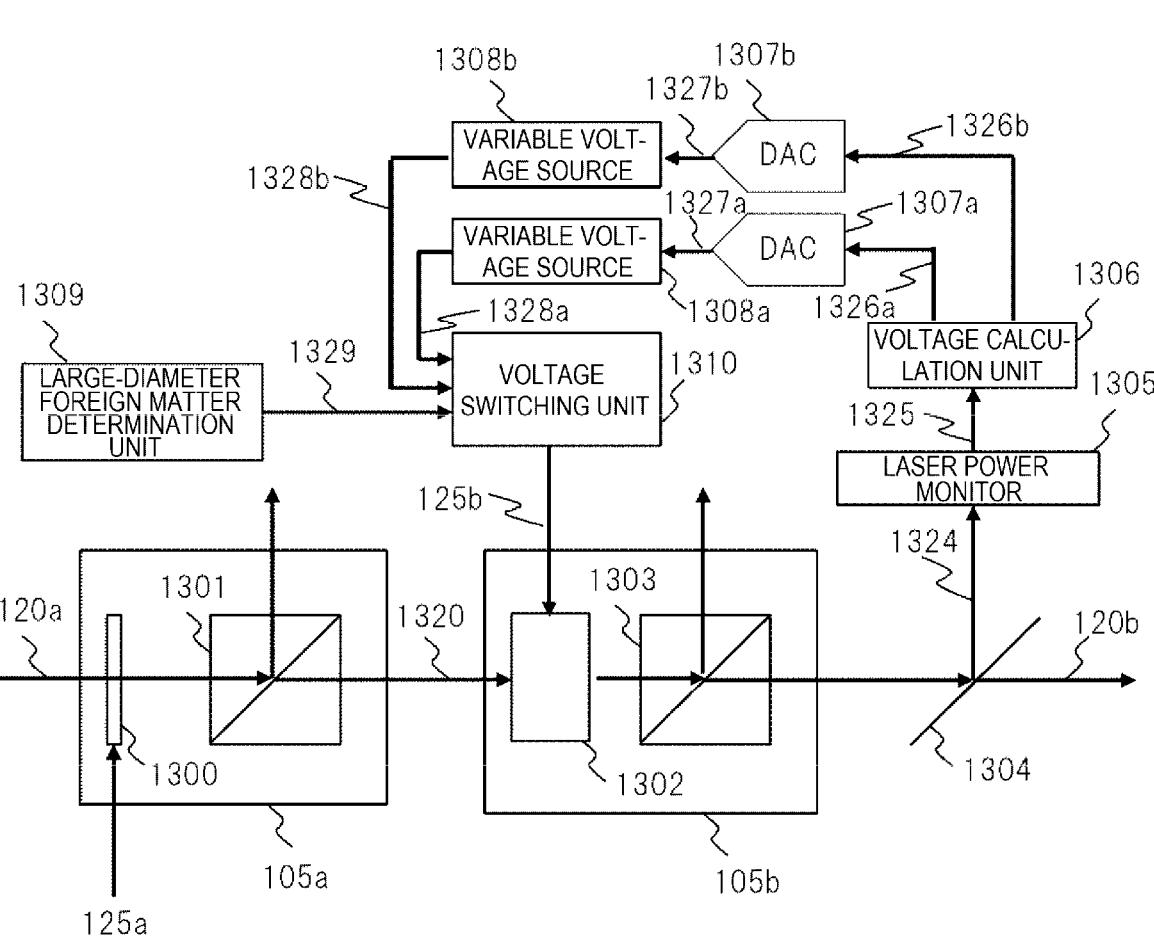
FIG. 13 shows a configuration example 1 of controlling an electro-optical element in Embodiment 5.
Figures 14, 15:
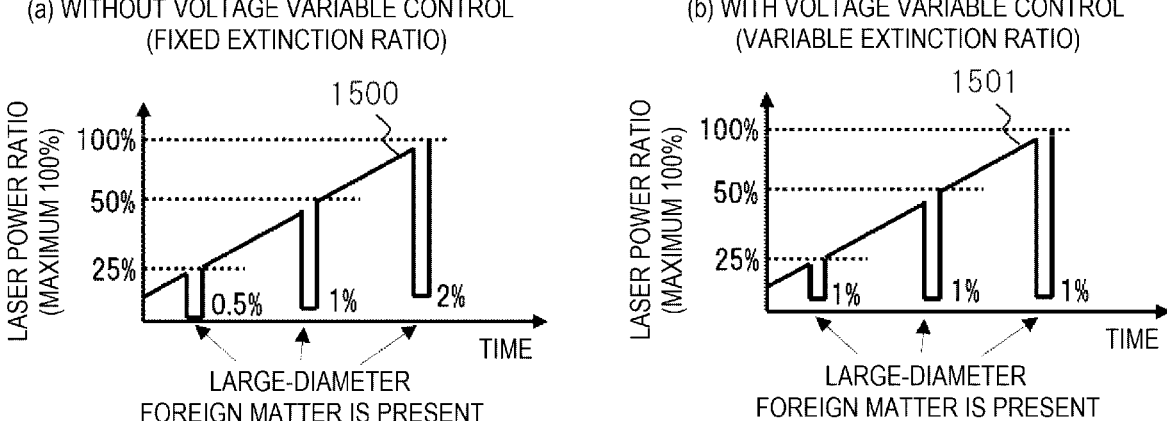
FIG. 14 shows a configuration example 2 of controlling the electro-optical element in Embodiment 5.
FIG. 15 shows an example of controlling laser power to be constant when a large-diameter foreign matter is present according to Embodiment 5.

With reference to FIGS. 13 to 15, an effective control method for two types of attenuators having different characteristics according to Embodiment 5 will be described. A basic configuration of an optical-type foreign matter inspection device according to Embodiment 5 is the same as or common to that in Embodiment 1 and the like. Hereinafter, a configuration different from that in Embodiment 1 or the like or a more specific configuration will be described in Embodiment 5.

[Laser Power Control When There is Large-Diameter Foreign Matter]

In the optical-type foreign matter inspection device 1 shown in FIG. 1, it is preferable to radiate high laser power in order to improve detection accuracy. However, in a case where there is a large foreign matter (hereinafter, referred to as a large-diameter foreign matter) on a sample, when the sample is irradiated with laser at high power, a phenomenon in which the foreign matter explodes and fragments scatter on the sample may occur.

As a method of avoiding this problem, there is a technique of detecting a large-diameter foreign matter and reducing laser power during a detection (hereinafter, referred to as explosion avoidance). For example, when a scattered light amount exceeds a certain threshold, it is determined that there is a large-diameter foreign matter at corresponding coordinates, and while a sample is rotated several times thereafter, laser power is greatly reduced at an angle corresponding to the coordinates to avoid explosion.

At this time, it is necessary to instantaneously change the laser power before and after the coordinates where the large-diameter foreign matter is present, and such a change is generally achieved by an electro-optical element 1302 in the variable optical attenuator 105b shown in FIG. 13.

In the present embodiment, at least one variable optical attenuator (the variable optical attenuator 105a shown in FIG. 13) includes a ½ wavelength plate 1300 and a polarized beam splitter 1301 similar to those in FIG. 8, and at least one variable optical attenuator (the variable optical attenuator 105b shown in FIG. 13) includes the electro-optical element 1302 and a polarized beam splitter 1303.

The electro-optical element 1302 changes a polarization state of a laser beam passing through the electro-optical element 1302 according to a voltage applied to the electro-optical element 1302. The electro-optical element 1302 can control the polarization state faster than the ½ wavelength plate 1300, and thus the variable optical attenuator 105b can control laser power faster than the variable optical attenuator 105a.

In the present embodiment, it is possible to continuously control the laser power and instantaneously control the laser power by combining the variable optical attenuators 105 having the above characteristics.

[Laser Power Control by Two Types of Attenuators]

FIG. 13 shows a configuration example of a part of the illumination optical system 160 shown in FIG. 1 according to the present embodiment. An optical-type foreign matter inspection device according to the present embodiment includes the following components.

- Variable optical attenuator 105a that can continuously change laser power at a relatively low speed
- Variable optical attenuator 105b that can, for example, instantaneously change laser power at a relatively high speed
- Half mirror 1304 that reflects a part of a laser beam radiated to a sample as reflected laser 1324
- Laser power monitor 1305 that measures laser power 1325 of the reflected laser 1324 reflected by the half mirror 1304
- Voltage calculation unit 1306 (in other words, a voltage calculation processor) that determines a plurality of voltages (a first voltage 1328a and a second voltage 1328b) to be applied to the electro-optical element 1302 based on the measured laser power 1325
- DAC 1307 that respectively converts voltage information 1326a representing the first voltage 1328a and voltage information 1326b representing the second voltage 1328b into first analog voltage information 1327a and second analog voltage information 1327b
- First variable voltage source 1308a that outputs the first voltage 1328a
- Second variable voltage source 1308b that outputs the second voltage 1328b
- Large-diameter foreign matter determination unit 1309 (in other words, a large-diameter foreign matter determination processor) that outputs foreign matter information indicating whether a large-diameter foreign matter is present based on the ADC output 123 of the A/D conversion circuit 108

Voltage switching unit 1310 (in other words, a voltage switch) that switches which of the first variable voltage source 1308a and the second variable voltage source 1308b is to be used based on foreign matter information 1329

Here, the electro-optical element 1302 is an element such as a Pockel cell, and can instantaneously change a polarization direction of incident laser 1320 according to an applied voltage (represented by the attenuator control value 125b). Therefore, for example, a high voltage is generated as the first voltage 1328a, a low voltage is generated as the second voltage 1328b, and the voltage is switched by the voltage switching unit 1310 at an appropriate timing, so that laser power can be instantaneously changed.

In this manner, the attenuator control unit 107 controls a polarization direction of a laser beam by connecting either one of the first variable voltage source 1308a and the second variable voltage source 1308b to the electro-optical element 1302. For example, when a voltage ratio is 50:1, an extinction ratio can be set to 50:1, and ideally, the transmittance can be switched at a high speed between 100% and 2%.

[Modification of Laser Power Control by Electro-optical Element]

FIG. 14 shows a configuration example in which voltage variable control can be performed more simply for the electro-optical element. When laser power corresponding to an inspection radius is known in advance as an inspection condition of a sample, a threshold can be controlled more simply by inputting the stage encoder signal 127 to the voltage calculation unit 1306.

That is, in the example shown in FIG. 14, the voltage calculation unit 1306 determines the first voltage 1328a and the second voltage 1328b based on the stage encoder signal 127.

According to the example shown in FIG. 14, the transmittance can be switched at a high speed in a similar manner to the example shown in FIG. 13. Further, since the laser power monitor 1305 shown in FIG. 13 is not required, the configuration becomes simpler.

[Optimization of Explosion Avoidance by Two-type Attenuator Control]

(a) of FIG. 15 shows a comparison of laser power control when a voltage (represented by the attenuator control value 125b) applied to the electro-optical element 1302 is fixed, and (b) of FIG. 15 shows a comparison of laser power control when a voltage applied to the electro-optical element 1302 is variable.

As described in Embodiment 1, in an inspection in which a rotation speed is constant, since a linear speed is proportional to an inspection position of a sample, for example, laser power is increased in proportion to time by the variable optical attenuator 105a. At this time, when a large-diameter foreign matter is detected, the variable optical attenuator 105b can instantaneously reduce the laser power.

As shown in (a) of FIG. 15, a voltage of the electro-optical element 1302 is fixed to two, for example, the transmittance of the variable optical attenuator 105b is 100% when there is no large-diameter foreign matter, and the transmittance of the variable optical attenuator 105b is 2% when there is a large-diameter foreign matter. A laser power ratio 1500 in this case is as follows.

In a case where there is a large-diameter foreign matter when the transmittance of the variable optical attenuator 105a is 25%, the final transmittance is 0.5%; in a case where there is a large-diameter foreign matter when the transmittance of the variable optical attenuator 105a is 50%, the final transmittance is 1%; and in a case where there is a large-diameter foreign matter when the transmittance of the variable optical attenuator 105a is 100%, the final transmittance is 2%. In the case where the voltage of the electro-optical element 1302 is fixed to two, it can be seen that the closer to the outer periphery, the higher the laser power when determining a large-diameter foreign matter. Accordingly, it is assumed that an explosion probability of a large-diameter foreign matter increases.

In contrast, the laser power 1325 of the laser beam 120b is measured by the laser power monitor 1305 shown in FIG. 13, a voltage corresponding to the laser power 1325 is generated, and a voltage of the electro-optical element 1302 is switched when there is a large-diameter foreign matter, so that laser power when a large-diameter foreign matter is detected can be kept constant as shown in (b) of FIG. 15.

For example, when the final transmittance (a value obtained by multiplying transmittances of the variable optical attenuators 105 of all stages) calculated based on the laser power 1325 is 25%, the final transmittance can be set to 1% by switching the transmittance of the variable optical attenuator 105b to ½ of a value at that time. Similarly, when the final transmittance is 50%, the final transmittance can be set to 1% by switching the transmittance of the variable optical attenuator 105b to ¹⁄₅₀ of a value at that time. Similarly, when the final transmittance is 100%, the final transmittance can be set to 1% by switching the transmittance of the variable optical attenuator 105b to ¹⁄₁₀₀ of a value at that time.

As described above, the laser power 1325 of the laser beam 120b is measured, and a voltage corresponding to the laser power 1325 is generated and applied to the electro-optical element 1302 when a large-diameter foreign matter is detected, so that, as shown in (b) of FIG. 15, it is possible to perform control such that a laser power ratio 1501 is constantly, for example, 1% regardless of laser power when the large-diameter foreign matter is detected.

[Appendix]

Although the invention has been specifically described above based on embodiments, the invention is not limited to the above-described embodiments, and various modifications can be made without departing from the scope of the invention. Components of the embodiments can be added, deleted, replaced, or the like except for essential components. The embodiments can be combined. Unless otherwise specified, each component may be single or plural. Various media such as a ROM, a RAM, a nonvolatile memory, an HDD, an SSD, a DVD, and an SD card can be used to store various kinds of data.

REFERENCE SIGNS LIST

1: optical-type foreign matter inspection device
101: sample
101a: position
101b: position
102: rotary stage
104: laser light source
105 (105a, 105b): variable optical attenuator
106: sensor
107: attenuator control unit (attenuator controller)
108: A/D conversion circuit
109: data processing unit (data processor)
120 (120a, 120b): laser beam (laser light)
122: sensor output (sensor output signal)

123: ADC output (output signal of ADC conversion circuit)

125 (125a, 125b) attenuator control value

126: motor control signal (stage drive signal)

127: stage encoder signal

300: linear speed calculation unit (linear speed processor)

301: transmittance table

302: transmittance and wavelength plate angle conversion table

303: pulse generator

400: stage signal counter

401 (401a, 401b): coordinate table

402: pulse generator

410: count value

800: ½ wavelength plate

801: polarized beam splitter

802: laser power monitor

805: power difference calculation unit (power difference calculation processor)

806: correction value deriving unit (correction value deriving processor)

813: power information

814: reference laser power information

815: difference information

816: correction value information

1001: foreign matter determination unit (foreign matter determination processor)

1002: threshold calculation unit (threshold processor)

1003: coordinate allocation unit (foreign matter coordinate processor)

1004: half mirror

1005: laser power monitor

1010: foreign matter threshold

1011: foreign matter information

1012: laser

1013: laser power

1210: foreign matter threshold

1300: ½ wavelength plate

1301: polarized beam splitter

1302: electro-optical element

1303: polarized beam splitter

1304: half mirror

1305: laser power monitor

1306: voltage calculation unit (voltage calculation processor)

1308a: first variable voltage source

1308b: second variable voltage source

1309: large-diameter foreign matter determination unit (large-diameter foreign matter determination processor)

1310: voltage switching unit (voltage switch)

1325: laser power

1328a: first voltage

1328b: second voltage

1329: foreign matter information

The invention claimed is:

1. An optical-type foreign matter inspection device that inspects a foreign matter on a surface of a sample, the optical-type foreign matter inspection device comprising:
   a rotary stage that is driven to rotate and on which the sample is placed;
   a laser light source configured to irradiate the surface of the sample with a laser beam;
   variable optical attenuators of two or more stages configured to adjust a light amount of the laser beam;
   a sensor configured to detect light scattered or reflected from the surface of the sample;

an A/D conversion circuit configured to convert an intensity of light received by the sensor into a digital pixel based on an output signal of the sensor;
   a data processor configured to receive an output signal of the A/D conversion circuit and coordinate information output from the rotary stage and associate the coordinate information with the output signal of the A/D conversion circuit to output the associated information as detection data; and
   an attenuator controller configured to control transmittances of the variable optical attenuators based on the coordinate information,
   wherein
   at least one of the variable optical attenuators includes a ½ wavelength plate and a polarized beam splitter,
   an angle of the ½ wavelength plate is changeable by a stepping motor, and the attenuator controller includes
   a stage signal counter configured to count a stage encoder signal from the rotary stage,
   a coordinate table that stores one or more angle change thresholds for changing the angle of the ½ wavelength plate, and
   a pulse generator configured to output a control pulse to the stepping motor when a count value of the stage encoder signal matches any one of the angle change thresholds.

2. The optical-type foreign matter inspection device according to claim 1, wherein
   the attenuator controller has a function of controlling the plurality of variable optical attenuators independently and sequentially.

3. The optical-type foreign matter inspection device according to claim 1, wherein
   the optical-type foreign matter inspection device further comprises
   a laser power monitor configured to measure the laser power of a laser reflected by the polarized beam splitter;
   a laser power memory configured to record reference laser power;
   a power difference calculation processor configured to calculate a difference between the measured laser power and the reference laser power; and
   a correction value deriving processor configured to derive a correction value of a transmittance of the at least one variable optical attenuator based on the difference, and
   the attenuator controller further controls the transmittance of the at least one variable optical attenuator based on the correction value.

4. The optical-type foreign matter inspection device according to claim 1, further comprising:
   a half mirror configured to reflect a part of the laser beam radiated to the sample;
   a laser power monitor configured to measure the laser power of a laser reflected by the half mirror;
   a foreign matter determination processor configured to compare the output signal of the A/D conversion circuit with a foreign matter threshold and output foreign matter information indicating whether a foreign matter is present;
   a threshold processor configured to determine the foreign matter threshold based on the laser power; and
   a foreign matter coordinate processor configured to output the coordinate information and the foreign matter information in association with each other.

5. The optical-type foreign matter inspection device according to claim 1, further comprising:

a foreign matter determination processor configured to compare the output signal of the A/D conversion circuit with a foreign matter threshold and output foreign matter information indicating whether a foreign matter is present;

a threshold processor configured to determine the foreign matter threshold based on the coordinate information; and a foreign matter coordinate processor configured to output the coordinate information and the foreign matter information in association with each other.

6. The optical-type foreign matter inspection device according to claim 1, wherein at least one another one of the variable optical attenuators includes an electro-optical element and a polarized beam splitter.

7. An optical-type foreign matter inspection device that inspects a foreign matter on a surface of a sample, the optical-type foreign matter inspection device comprising:

a rotary stage that is driven to rotate and on which the sample is placed;

a laser light source configured to irradiate the surface of the sample with a laser beam;

variable optical attenuators of two or more stages configured to adjust a light amount of the laser beam:

a sensor configured to detect light scattered or reflected from the surface of the sample;

an A/D conversion circuit configured to convert an intensity of light received by the sensor into a digital pixel based on an output signal of the sensor:

a data processor configured to receive an output signal of the A/D conversion circuit and coordinate information output from the rotary stage and associate the coordinate information with the output signal of the A/D conversion circuit to output the associated information as detection data; and an attenuator controller configured to control transmittances of the variable optical attenuators based on the coordinate information;

a half mirror configured to reflect a part of the laser beam radiated to the sample;

a laser power monitor configured to measure laser power of laser reflected by the half mirror;

a large-diameter foreign matter determination processor configured to output foreign matter information indicating whether a large-diameter foreign matter is present based on the output signal of the A/D conversion circuit;

a voltage calculation processor configured to determine a first voltage and a second voltage based on the measured laser power;

a first variable voltage source configured to output the first voltage;

a second variable voltage source configured to output the second voltage; and a voltage switch configured to switch which of the first variable voltage source and the second variable voltage source is to be used based on the foreign matter information, wherein at least one of the variable optical attenuators includes a ½ wavelength plate and a polarized beam splitter, at least one another one of the variable optical attenuators includes an electro-optical element and a polarized beam splitter, and the attenuator controller controls a polarization direction of the laser beam by connecting either one of the first variable voltage source and the second variable voltage source to the electro-optical element.

8. The optical-type foreign matter inspection device according to claim 7, wherein the attenuator controller has a function of controlling the plurality of variable optical attenuators independently and sequentially.

9. The optical-type foreign matter inspection device according to claim 7, wherein at least one of the variable optical attenuators includes a ½ wavelength plate and a polarized beam splitter, an angle of the ½ wavelength plate is changeable by a stepping motor, and the attenuator controller comprises a linear speed processor configured to calculate a linear speed based on the coordinate information;

a transmittance table for determining a transmittance of the at least one variable optical attenuator based on the linear speed;

an angle conversion table for determining an angle of the ½ wavelength plate based on the transmittance; and a pulse generator configured to output a control pulse to the stepping motor based on the angle.

10. The optical-type foreign matter inspection device according to claim 7, wherein at least one of the variable optical attenuators includes a ½ wavelength plate and a polarized beam splitter, an angle of the ½ wavelength plate is changeable by a stepping motor, and the attenuator controller includes a stage signal counter configured to count a stage encoder signal from the rotary stage, a coordinate table that stores one or more angle change thresholds for changing the angle of the ½ wavelength plate, and a pulse generator configured to output a control pulse to the stepping motor when a count value of the stage encoder signal matches any one of the angle change thresholds.

11. The optical-type foreign matter inspection device according to claim 7 wherein at least one of the variable optical attenuators includes a ½ wavelength plate and a polarized beam splitter, the optical-type foreign matter inspection device further comprises a laser power monitor configured to measure the laser power of a laser reflected by the polarized beam splitter;

a laser power memory configured to record reference laser power;

a power difference calculation processor configured to calculate a difference between the measured laser power and the reference laser power; and a correction value deriving processor configured to derive a correction value of a transmittance of the at least one variable optical attenuator based on the difference, and the attenuator controller further controls the transmittance of the at least one variable optical attenuator based on the correction value.

12. The optical-type foreign matter inspection device according to claim 7, further comprising:

a half mirror configured to reflect a part of the laser beam radiated to the sample;

a laser power monitor configured to measure the laser power of a laser reflected by the half mirror;

a foreign matter determination processor configured to compare the output signal of the A/D conversion circuit with a foreign matter threshold and output foreign matter information indicating whether a foreign matter is present;

a threshold processor configured to determine the foreign matter threshold based on the laser power; and a foreign matter coordinate processor configured to output the coordinate information and the foreign matter information in association with each other.

13. The optical-type foreign matter inspection device according to claim 7, further comprising:

a foreign matter determination processor configured to compare the output signal of the A/D conversion circuit with a foreign matter threshold and output foreign matter information indicating whether a foreign matter is present;

a threshold processor configured to determine the foreign matter threshold based on the coordinate information; and a foreign matter coordinate processor configured to output the coordinate information and the foreign matter information in association with each other.

14. An optical-type foreign matter inspection device that inspects a foreign matter on a surface of a sample, the optical-type foreign matter inspection device comprising:

a rotary stage that is driven to rotate and on which the sample is placed;

a laser light source configured to irradiate the surface of the sample with a laser beam;

variable optical attenuators of two or more stages configured to adjust a light amount of the laser beam;

a sensor configured to detect light scattered or reflected from the surface of the sample;

an A/D conversion circuit configured to convert an intensity of light received by the sensor into a digital pixel based on an output signal of the sensor;

a data processor configured to receive an output signal of the A/D conversion circuit and coordinate information output from the rotary stage and associate the coordinate information with the output signal of the A/D conversion circuit to output the associated information as detection data; and an attenuator controller configured to control transmittances of the variable optical attenuators based on the coordinate information;

a large-diameter foreign matter determination processor configured to output foreign matter information indicating whether a large-diameter foreign matter is present based on the output signal of the A/D conversion circuit;

a voltage calculation processor configured to determine a first voltage and a second voltage based on the coordinate information;

a first variable voltage source configured to output the first voltage;

a second variable voltage source configured to output the second voltage; and a voltage switch configured to switch which of the first variable voltage source and the second variable voltage source is to be used based on the foreign matter information, wherein at least one of the variable optical attenuators includes a ½ wavelength plate and a polarized beam splitter, at least one another one of the variable optical attenuators includes an electro-optical element and a polarized beam splitter, and the attenuator controller controls a polarization direction of the laser beam by connecting either one of the first variable voltage source and the second variable voltage source to the electro-optical element.

15. The optical-type foreign matter inspection device according to claim 14, wherein the attenuator controller has a function of controlling the plurality of variable optical attenuators independently and sequentially.

16. The optical-type foreign matter inspection device according to claim 14, wherein at least one of the variable optical attenuators includes a ½ wavelength plate and a polarized beam splitter, an angle of the ½ wavelength plate is changeable by a stepping motor, and the attenuator controller comprises a linear speed processor configured to calculate a linear speed based on the coordinate information;

a transmittance table for determining a transmittance of the at least one variable optical attenuator based on the linear speed;

an angle conversion table for determining an angle of the ½ wavelength plate based on the transmittance; and a pulse generator configured to output a control pulse to the stepping motor based on the angle.

17. The optical-type foreign matter inspection device according to claim 14, wherein at least one of the variable optical attenuators includes a ½ wavelength plate and a polarized beam splitter, an angle of the ½ wavelength plate is changeable by a stepping motor, and the attenuator controller includes a stage signal counter configured to count a stage encoder signal from the rotary stage, a coordinate table that stores one or more angle change thresholds for changing the angle of the ½ wavelength plate, and a pulse generator configured to output a control pulse to the stepping motor when a count value of the stage encoder signal matches any one of the angle change thresholds.

18. The optical-type foreign matter inspection device according to claim 14, wherein at least one of the variable optical attenuators includes a ½ wavelength plate and a polarized beam splitter, the optical-type foreign matter inspection device further comprises a laser power monitor configured to measure the laser power of a laser reflected by the polarized beam splitter;

a laser power memory configured to record reference laser power;

a power difference calculation processor configured to calculate a difference between the measured laser power and the reference laser power; and a correction value deriving processor configured to derive a correction value of a transmittance of the at least one variable optical attenuator based on the difference, and the attenuator controller further controls the transmittance of the at least one variable optical attenuator based on the correction value.

19. The optical-type foreign matter inspection device according to claim 14, further comprising:

a half mirror configured to reflect a part of the laser beam radiated to the sample;

a laser power monitor configured to measure the laser power of a laser reflected by the half mirror;

a foreign matter determination processor configured to compare the output signal of the A/D conversion circuit with a foreign matter threshold and output foreign matter information indicating whether a foreign matter is present;

a threshold processor configured to determine the foreign matter threshold based on the laser power; and a foreign matter coordinate processor configured to output the coordinate information and the foreign matter information in association with each other.

20. The optical-type foreign matter inspection device according to claim 14, further comprising:

a foreign matter determination processor configured to compare the output signal of the A/D conversion circuit with a foreign matter threshold and output foreign matter information indicating whether a foreign matter is present;

a threshold processor configured to determine the foreign matter threshold based on the coordinate information; and a foreign matter coordinate processor configured to output the coordinate information and the foreign matter information in association with each other.

* * * * *